Nov. 21, 1933.  E. P. HILL  1,936,236
VALVE
Filed Dec. 26, 1930
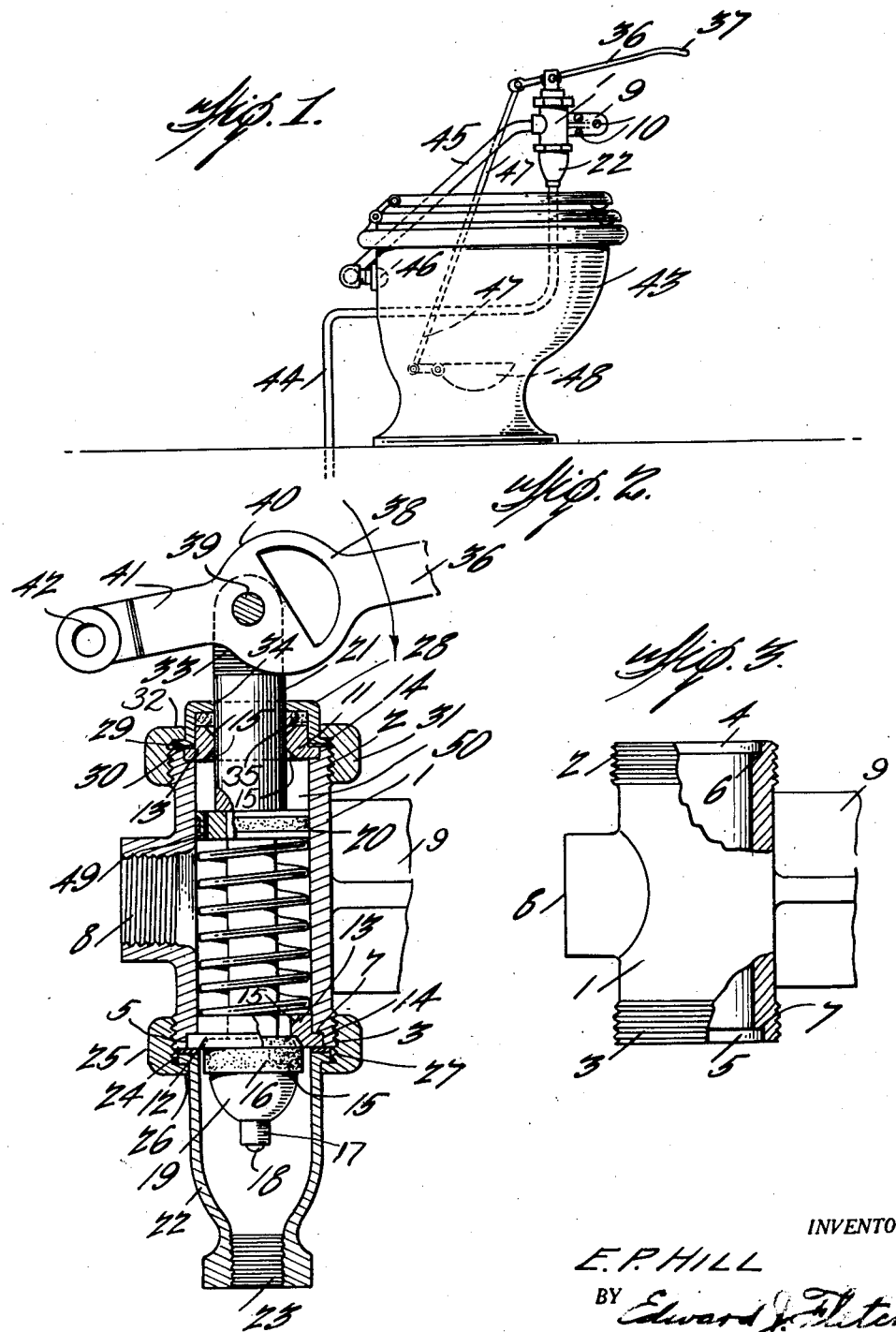
INVENTOR.
E. P. HILL
BY Edward J. Fletcher
ATTORNEY.

UNITED STATES PATENT OFFICE 1,936,236

VALVE

Edward P. Hill, Savannah, Ga.

Application December 26, 1930
Serial No. 504,892

4 Claims. (Cl. 137—93)

This invention is directed to an improvement in valves designed more particularly for use in connection with passenger car toilets.

Conventionally, toilets of this type include a valve for the control of the flushing of the water, a handle member for operating the valve, and a connection whereby the handle member when operated also actuates the usual dump pan.

Ordinarily, in the event that the packing renewal or repair of valve parts becomes necessary, such operation can be only carried out by a substantial dismantling of the toilet proper; and furthermore as the valves for different toilets will necessarily occupy different relative positions owing to the location of the toilet, the valves as conventionally constructed are necessarily for right or for left hand application with respect to the toilet in order that the valve may be best adapted to the position of the particular toilet.

The valve of the present invention is designed more particularly to overcome the objections above noted and others equally apparent of the conventional constructions, and to this end the invention is designed to provide a valve in which the parts are readily separable for renewal or repair without the necessity of removing the toilet; a further object of the invention being in the provision of a valve which in itself and through mere reversal of the valve body becomes readily appropriated for use in either a right hand or left hand position, thereby adapting a standard structure of valve to any and all positions in which the valve may necessarily be connected as restricted by the position of the particular toilet.

A further object of the invention is the provision of a simple valve operator which, while positive and effective in its action, is nevertheless simple and easy to operate and readily separable from the valve structure in the event of repair or replacement of valve parts.

The invention is illustrated in the accompanying drawing, in which:—

Figure 1 is a view in elevation illustrating the use of the valve in connection with a car toilet.

Figure 2 is an enlarged vertical sectional view partly in elevation of the valve.

Figure 3 is a broken elevation of the valve body.

The improved valve includes a valve body 1 of barrel-like form throughout. The respective ends of the body are exteriorly threaded, as at 2 and 3, and the body is interiorly formed adjacent the respective ends with a circumferential enlargement, as 4 and 5, forming abrupt shoulders 6 and 7. The respective ends of the body are thus of identical formation, each including the exteriorly threaded portion, the interior terminal enlargement, and the abrupt shoulder formed by the enlargement. The body 1 is formed with an outlet 8 arranged centrally of its length and appropriately formed for pipe connection, said body also having a securing plate 9 integral with the body and diametrically opposite the outlet 8, the plate 9 being secured to the body by appropriate reinforcing web construction to insure that with the securing of the plate to a fixture, as through screw holes 10, the valve body will be properly supported.

Ring elements 11 and 12 of identical structure are adapted to cooperate with the body, each ring element having a portion 13 adapted to snugly fit within the body 1 and a flange 14 snugly fitting within the enlargement at the respective ends of the body, indicated at 4 and 5, and bearing on the shoulders 6 and 7. As stated, the rings are of identical form and, therefore, interchangeable for a purpose which will be later explained. Each ring is formed in the flange portion with a conical seat 15, and as the rings are disposed in the body with the flange outermost, the valve seats 15 flare outwardly with respect to the body, as clearly indicated in Figure 2.

The valve proper includes a compressible plug 16, preferably of the Fuller valve type, designed to cooperate with the seat 15 of one of the rings and formed for seating engagement with the seat 15 of that ring when the valve is in closed position. The valve plug is secured upon a stem 17 which may, for the reception of the valve, be reduced and threaded, as at 18, and the plug held in position by a metallic cap or nut 19 threaded on the reduced end of the stem. The stem extends through the ring with which the valve plug is designed to cooperate and is provided remote from the valve plug with an annular collar 20 having a diameter appropriate to insure a substantial sealing, sliding cooperation with the interior of the valve body 1.

Beyond the collar 20 the valve stem is extended as a diametrically enlarged section 21 having a diameter to slidably cooperate with the opening the rings 13. A coiled spring bears between the collar 20 and the particular ring 13 with which the valve plug is designed to cooperate and serves to return the valve to closed position on the release of operating pressure, as will later appear.

The inlet end of the body is provided with a sleeve-like extension 22, one end of which is reduced and threaded at 23 for the practical coupling thereto of a supply pipe. The opposite end of the sleeve has a flange 24 which overlies and bears upon both the flange 14 of the ring at that end of the body and the similar end of the body, it being understood that when the rings 13 are in position in the body, their relatively outer surfaces are flush with the respective ends of the body.

A clamping nut 25 engages the threaded ends of the body having an inwardly extending flange 26 to overlie the flange 24 of the sleeve 22, the nut 25 cooperating with the threads on the end of the body and, if desired, a flexible gasket 27 may be interposed between the flange 24 of the sleeve 22 and the overlying portions of the ring and body 1 to seal the connection. The ring 13 at the end of the body opposite the valve is rigidly secured in place by a hollow cap 28 having a lateral flange 29 to bear through the medium of an interposed gasket 30 on the underlying ring 13 and the adjacent end of the body 1. A clamping nut 31 is arranged for threaded connection with the threads 2 at this end of the body and has a flange 32 to overlie the flange 29 of the cap and secure the parts in fixed relation.

In this connection, it is to be noted that the cap prior to the seating of the nut 31 may be turned to any desired position, as this capability tends to a desirable result in connection with the structure as a whole. The cap 28 is provided with upstanding, spaced ears 33, and the diametrically enlarged extension 21 of the valve stem is of such length that when the parts are in connected relation this stem extends through an opening 34 in the cap and above the latter between the ears 33. A cylindrical section of appropriate sealing material 35 encircles the valve stem extension 21, resting between the upper end of the cap 28 and the ring 13, so that when the nut 31 is tightened, a sealing juncture is effected to prevent leakage around the valve stem extension.

The valve is moved to open position through the medium of an operating lever 36 appropriately formed at one end as a handle 37 and provided adjacent its opposite end with a circular enlargement 38 which, through the medium of a pivot pin 39, is mounted eccentrically between the ears 33. The pivot pin is formed for convenient removal as, for example, provided at one end with a head and at the opposite end with a removable connector to prevent accidental separation of the pin. The circular enlargement 38 presents a relatively broad bearing surface 40 which rests upon the upper end of the valve stem extension 21, and the eccentric mounting of this enlargement is such that when the handle end of the lever is depressed, the enlargement riding upon the upper end of the valve stem extension 21 depresses such valve stem to an extent to permit the valve to be forced to an open position. The operating lever 36 is extended beyond the enlargement 38, as at 41, and terminally formed with an opening 42 so that this extension 41 of the lever is operated in a direction opposite the movement of the handle end of the lever in the unseating of the valve.

The valve with the parts connected and arranged as described is applied above the conventional toilet 43 through the medium of the plate 9 which, of course, is connected to an appropriate fixture. The service pipe 44 for the water is connected to the end 23 of the sleeve extension 22. An outlet pipe 45 is connected to the outlet 8 of the body and leads to the bowl of the toilet and there connects with any desired form of nozzle or spray, indicated at 46, for the delivery of the water with a proper whirling motion and in proper quantity for the flushing operation. The opening 42 in the operating lever extension is connected by a rod 47 to the usual dump pan 48 so that as the lever is operated to open the valve, the dump pan is moved to an open position so that the flushing operation of the water creates an effective discharge.

An important feature of the present invention resides in its complete reversibility in order that a standard valve construction may be readily adapted for use with toilets of this character arranged in different positions and, therefore, requiring reverse locations of the valve. For example, in some installations the bowl is so arranged that the valve support is at the left of the bowl and in other installations the valve support must be at the right of the bowl in order to adapt the valve to the bowl and to the adjacent fixture from which the valve must be supported. Ordinarily, it is necessary to have valves with reversely arranged securing means and cooperating parts in order to secure this result, while with the present invention this disadvantage is overcome.

It is quite apparent from the above description that all parts are completely reversible, that is, the clamping nuts and rings 13 may be removed from the valve as well as the valve stem and valve plug, and the valve stem and plug completely reversed, cooperating with the opposite end of the valve body, which will place the plate 9 on the opposite side of the valve body and thus permit or adapt the valve for securing it in either of these desirable positions. Of course, the plate may be secured in any rotative position with respect to the body and the complete revoluble adjustment of the cap 28 before it is secured in position permits the disposition of the handle 36 in any proper desired relation to the plate 9 so that the valve may be secured in position and the handle placed in the most convenient relation to the valve for operation.

As the ring 13 carried by the valve stem is in effect not removable from the stem, of course any reversal of the valve requires the removal of the remaining ring 13, the complete reversal of the valve stem, valve and ring and the application of the free ring to the opposite end of the body. The extension 22 and also the cap 28 may obviously be applied to either end of the body so that a complete reversal of the valve and its parts is readily effected. Thus a standard valve may be provided for all equipments and the valve parts assembled as necessary in order to permit the securing of the valve to the fixture in the proper position.

A further and essential feature of the valve is the simplicity with which the interior parts thereof may be removed for repair or replacement without disturbing the valve connection. Obviously through the removal of the sleeve 22 following the removal of the nut 25, the entire valve assembly may be removed from the body, and this is also true of the valve operating lever and cap connection and this without disturbing the outlet pipe 45 or the connection of the body 1 to the fixture. Thus the valve may be readily and conveniently repaired, repacked or any part thereof may be readily replaced without disturbing the valve connection. This is an important feature because where such valves require replacement or repacking, it is of essential importance that the operation be carried out speedily in order that the use of the apparatus may not be interrupted for any considerable time.

The collar 20 is preferably formed with an opening 49 extending therethrough, and it is to be noted that when the valve is in closed position there is a space 50 between the collar 20 and the overlying ring 13. When the valve is opened, a portion of the incoming water passes through the opening 49, accumulating in the space 50 between the collar and the ring 13, and serves as a cushioning means for the closing movement of the valve, thus permitting the valve to move to its seat slowly and with no appreciable jar or impact.

Of course, it is to be understood that the various parts of the valve are made of appropriate material and in appropriate size for the work for which they are designed, and in this connection no restriction is to be understood either as to size or material either in the valve parts or in the operating means therefor. Of course, as the valve is opened to admit the flushing water, the pan is also dumped, as is conventionally required in valves of this type.

Having thus described the invention, what is claimed as new, is:—

1. A valve including a tubular body of uniform diameter throughout, an outlet at one side of the body, a support at the diametrically opposite side of the body, shoulders formed at the respective ends of the body, rings removably fitted on said shoulders, said rings and shoulders providing for interchange of the rings at the respective ends of the body, a valve stem slidable through one of the rings, a valve cooperating with the other of said rings and connected to said stem, an inlet cooperative with either end of the body and securing the valve-cooperating ring in place, a cap cooperative with either end of the body and securing the valve-stem carried ring in place, and means carried by the cap for cooperating with said valve stem for operating the valve.

2. A valve including a tubular body of uniform diameter, an inlet at one end of the valve, a cap at the opposite end of the valve, said body being formed for interchangeability of the cap and inlet, identical rings interfitted with the body and interchangeable therein, one of the rings being held by the cap and the other of said rings being held by the inlet, a valve cooperating with one of said rings and operating wholly within the inlet, a stem cooperating with the other of said rings and extending through the cap, and means carried by the cap for operating the stem.

3. A valve including a tubular body terminally formed with shoulders, identical rings loosely seated in said body and held by said shoulders, the rings and shoulders permitting interchange of the rings, a cap having threaded connection with the body and serving to fix one ring in place, an inlet having threaded connection with the body and serving to fix the other ring in place, the cap and inlet being interchangeable, a valve cooperating with one ring and operating wholly within the inlet, a cap carried operating means for the valve, said means extending slidably through the other ring, and means operating wholly within the body for normally holding the valve closed.

4. A valve including a body of tubular form and uniform diameter throughout, the respective ends of the body being formed with identical inner shoulders and identical outer threads, an inlet section cooperative with either outer threads, a cap cooperative with either outer threads, identical rings, either being cooperative with either of the internal shoulders at each end of the body, the cap and inlet section serving to removably hold the particular cap-ring or inlet-ring in place, each ring being formed with an inner seat, the seat of one ring forming a valve seat and the seat of the other ring forming a packing seat, a valve cooperating with the valve seat of one ring and operating wholly within the inlet section, a valve stem extending through the other ring and through the cap, and valve operating means carried by the cap, the cooperation of the cap with the body permitting the operating means to extend in any selected direction.

EDWARD P. HILL. [L. S.]